Patented June 9, 1942

2,285,477

UNITED STATES PATENT OFFICE 2,285,477

METHOD OF PRODUCING SOLS

John F. White, Medford, Mass., assignor to Monsanto Chemical Company, St. Louis, Mo., a corporation of Delaware No Drawing. Application November 9, 1940, Serial No. 365,010

13 Claims. (Cl. 252—313)

This invention relates to improved methods for preparing sols, particularly relatively stable aqua or organo-aquasols of inorganic substances, such as silica, alumina, magnesia, thoria, titania, stannic oxide, chromic oxide, nickel oxide, and the like.

A method of preparing relatively stable sols of the type described has already been developed. According to this previously developed method, silica sols, for example, are prepared by first forming an aquasol by the action of an acid, preferably sulfuric acid, on an aqueous solution of sodium silicate. As soon as this aquasol is prepared and before appreciable growth of silica particles can take place, a water-miscible solvent, such as alcohol, acetone, or the like is added with the result that the solubility of the inorganic salt formed during the reaction, e. g. sodium sulfate, is lowered to such an extent that substantially all of the salt is precipitated from solution. The salt is then removed by decantation or any other suitable means leaving an organo-aquasol which is adapted for a wide variety of commercial uses.

In view of the dilution effected by the addition of solvent and the resulting removal of salt, as well as the change in the polarity of the mixed solvent phase resulting from such addition, the sol prepared by the above method is relatively stable and can be retained in sol form for a considerable period of time. However, relatively large quantities of solvent are necessary to reduce the solubility of the inorganic salt, the minimum amount of solvent required being equal to the amount by volume of the aquasol formed, and this not only causes an undesirable decrease in the concentration of $SiO_2$ in the resultant sol but increases the cost of the process very materially due to the large amount of alcohol or other organic solvent required and the fact that for many purposes this solvent must be removed. Thus, the aquasol prepared initially by the above method contains from 15 to 20% of $SiO_2$, but when an equal amount of alcohol by volume is added the $SiO_2$ concentration of the final product is necessarily only half as much as in the initial sol, and may be reduced still further, as frequently larger amounts of alcohol are employed.

It is accordingly an important object of the present invention to provide a method of preparing inorganic sols which have a relatively high content of silica or other inorganic oxide.

A further object of the invention is to provide a method of preparing inorganic sols of the type described which not only contain a relatively large amount of silica or other oxide, but also are relatively free of inorganic salts.

A still further object of the invention is to provide a method of preparing sols of the type described which either have no organic solvent admixed therewith or contain only a relatively small proportion thereof.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

The invention is carried out, in general, by first preparing an aquasol of suitable concentration, and then cooling the resulting sol until the greater portion of the salt formed during the sol reaction has precipitated out, after which the salt is separated from the sol in any suitable manner, such as by filtration, centrifuging, settling, or the like. If a more complete removal of the salt is desired than is possible by cooling alone, a relatively small amount of a water-miscible organic solvent, such as ethyl or propyl alcohol or acetone may be added to the sol prior to cooling. This not only further reduces the solubility of the inorganic salt formed during the initial sol formation, thereby permitting its more complete removal, but increases the stability of the final sol, due both to the reduced amount of salt present therein and the change in the polarity of the system resulting from the mixture of solvents formed.

In further describing the invention reference will be made solely to the preparation of silica sols for the sake of convenience, it being understood, however, that like methods may be used in the preparation of sols of other inorganic substances. Thus, in accordance with a preferred form of the invention a silica-aqua sol containing from 15 to 20% $SiO_2$ is first prepared. This may be done by mixing an aqueous solution of sodium silicate with an aqueous acid in suitable concentrations and proportions. It is preferable, however, to employ a slight excess of acid, i. e. sufficient to produce and maintain a pH of between 1.8 and 4.5 in the sol, as under neutral or alkaline conditions conversion of the sol to the gel form is favored and the stability of the sol is markedly diminished. When sulfuric acid is used to react with the silicate, it is frequently desirable to partially cool the initially formed aquasol and to seed it with crystals of $Na_2SO_4 \cdot 10H_2O$ prior to adding the organic solvent or subjecting the sol to final cooling. This insures the formation of a well shaped and easily separated precipitate consisting essentially of the $10H_2O$ hydrate.

It is preferable to cool the sol down to temperatures in the neighborhood of 0° C. regardless of whether organic solvent is added or not. Lower temperatures than this are not required, as the solubility of sodium sulfate reaches a practical constant at 0° C. Higher temperatures, that is up to about 15° or 20° C., may be employed, but are less desirable, since they require the use of larger amounts of alcohol than are necessary at 0° C.

When the presence in the sol of sodium sulfate, or like salt, in amounts of as high as 3% are not objectionable, it is possible to rely solely upon cooling to obtain sols of high concentration, unusual stability, and relatively low cost. When, however, it is desirable to obtain products having a sodium sulfate content of less than 1%, it is necessary to admix an organic solvent, such as alcohol, with the sol, preferably prior to the cooling. Such solvent may, however, also be added during or after exposing the sol to the low temperatures prescribed herein. The solvent may be added in any amount up to about 25% by weight, depending upon how important it is to remove substantially all of the sodium sulfate or other salt. No advantage is gained in adding more than 25% of solvent, however, as with greater amounts it becomes unnecessary to cool the sol, the salt being under such conditions sufficiently insoluble at room temperatures.

A more thorough understanding of the invention will be obtained from the following examples:

*Example 1.*—A solution of sodium silicate is first prepared by dissolving 720 pounds of sodium silicate containing about 8.9% $Na_2O$ and about 29% $SiO_2$ in about 314 pounds of water. The resulting solution is then mixed by intensive stirring with a solution consisting of 106 pounds of 100% $H_2SO_4$ dissolved in 233 pounds of water. During the mixing the temperature of the mass is maintained by means of suitable cooling coils at about 15° C. When the mixing is completed, the sol is cooled to 0° C. and held at this point until the crystallization is substantially complete, which usually requires about ten minutes. The precipitate of $Na_2SO_4 \cdot 10H_2O$ thus formed is then separated by any convenient method, such as filtration or centrifuging, and a sol is produced having the following constituents and properties:

| | | |
|---|---|---|
| $SiO_2$ | per cent | 18.7 |
| $Na_2SO_4$ | do | 3.2 |
| $H_2SO_4$ | do | 0.4 |
| Stability at 25° C. | hours | 3 |
| Stability at 0° C. | do | 12 |

*Example 2.*—Aqueous solutions of sodium silicate and sulfuric acid are admixed in the same manner and in the same proportions as in Example 1. A small amount of seed crystals ($Na_2SO_4 \cdot 10H_2O$) is then added to the resulting aquasol, after which the sol is admixed with 65 pounds of 92.5% ethyl alcohol, the percentage of alcohol being by weight. The resulting mixture is then cooled to 0° C. and held at this temperature for about ten minutes, after which a crystalline precipitate forms which is separated by filtration, centrifuging, or the like. The sol remaining has the following constituents and properties:

| | | |
|---|---|---|
| $SiO_2$ | per cent | 17.8 |
| $C_2H_5OH$ | do | 5.2 |
| $Na_2SO_4$ | do | 1.64 |
| $H_2SO_4$ | do | 0.4 |
| Stability at 25° C. | hours | 6 |
| Stability at 0° C. | do | 29 |

*Example 3.*—An aquasol is first prepared by admixing sodium silicate, sulfuric acid and water in the proportions given in Example 1. A small amount of seed crystal is then added to the sol, after which the sol is admixed with 202 pounds of 92.5% ethyl alcohol. The resulting mixture is then cooled to 0° C. and maintained at this temperature for about ten minutes to permit substantially complete precipitation of crystalline $Na_2SO_4 \cdot 10H_2O$. Upon removing this precipitate in any suitable manner, a sol is obtained having the following constituents and properties:

| | | |
|---|---|---|
| $SiO_2$ | per cent | 16.6 |
| $C_2H_5OH$ | do | 14.8 |
| $Na_2SO_4$ | do | 0.67 |
| $H_2SO_4$ | do | 0.3 |
| Stability at 25° C. | hours | 23 |
| Stability at 0° C. | do | 108 |

*Example 4.*—Aqueous solutions of sodium silicate and sulfuric acid are prepared and mixed as described in Example 1. To the resulting aquasol 405 pounds of 92.5% ethyl alcohol are then added, and the mixture is cooled to 0° C. and held at this temperature for ten minutes. Upon separating the crystalline hydrate thus formed a sol is obtained having the following constituents and properties:

| | | |
|---|---|---|
| $SiO_2$ | per cent | 14.3 |
| $C_2H_5OH$ | do | 25.4 |
| $Na_2SO_4$ | do | 0.26 |
| $H_2SO$ | do | 0.3 |
| Stability at 25° C. | hours | 62 |
| Stability at 0° C. | do | 240 |

In each of the above examples the term stability denotes the period of time which elapsed between the preparation of the sol and the time at which it begins to gel.

Although the above examples describe in each instance the use of sulfuric acid and alcohol, it is to be understood that other acids and solvents may be substituted for these with equally good results. Thus, the sulfuric acid may be replaced with hydrochloric or nitric acid or any similar acid, which is sufficiently strong to obtain the desired pH in the sol without the addition of large amounts in excess of that required for neutrality and is capable of producing relatively insoluble salts under the conditions encountered; and the ethyl alcohol may be replaced with methyl, propyl or isopropyl alcohol, or with such solvents as acetone or methyl, ethyl or butyl cellosolve. Likewise, it is possible to prepare sols other than those of silica, as the methods of this invention are suitable for the preparation of any inorganic sol, from which the simultaneously formed inorganic salt can be precipitated by cooling or a combination of cooling and solvent addition.

It is usually desirable in the preparation of the sols to operate slightly on the acid side and, for most purposes, at a pH of 4.5 or less, as this increases the stability of the sols. If for any reason this acidity is objectionable, however, the sols may be neutralized after the precipitation of the inorganic salt, for example, by adding a suitable quantity of an alkali, such as sodium hydroxide, dissolved in alcohol or other organic solvent. Such treatment, however, results in more or less immediate gelation, which is usually to be avoided.

Although the methods described herein result in the formation of either aquasols or organoaquasols, it is possible to prepare relatively pure organosols in a similar manner by first preparing a salt free aquasol in the manner described herein, i. e. by cooling, and then replacing the water with an organic solvent, as for example by mixing a high boiling water-miscible solvent, such as methyl, ethyl or butyl cellosolve, with the aquasol and subjecting the mixture to vacuum distillation or the like. Cooling is usually not required in the formation of salt free organosols, the presence of relatively large amounts of the solvent usually being sufficient, but cooling is necessary, when the organic solvent selected is not capable of effectively precipitating the inorganic salt present in the initial sol.

The methods described herein not only permit the formation of sols which are relatively stable, but they result in the production of sols of considerably higher $SiO_2$ or other oxide content than is possible in accordance with prior methods. Moreover, the sols prepared in accordance with this invention are substantially free of, or contain only minute amounts of sodium sulfate or other contaminating salt, and they also contain much less alcohol or other organic solvent than previous sols, and in some instances, as when the presence of slightly larger amounts of salt is not undesirable, are entirely devoid of such solvent. Thus, the methods of this invention not only result in an improved product, but they may be carried out more economically than has heretofore been possible.

The sols prepared in accordance with the methods described herein may be used as film forming agents, either alone or in combination with other coating materials, and for example, are especially suitable for providing protective coatings on granule surfaced roofing. They are also useful in the preparation of aerogels, such as those described in the patent of Samuel S. Kistler, No. 2,093,454, and are to be preferred to Kistler's hydrogels for this purpose, since they do not require washing prior to autoclaving.

What I claim is:

1. The method of preparing a relatively stable sol which comprises forming an aquasol containing a dissolved inorganic salt and a colloidal inorganic oxide, cooling said aquasol until a major proportion of said salt precipitates out, and then removing the precipitated salt.

2. The method of preparing a relatively stable sol which comprises forming an aquasol containing a dissolved inorganic salt and a colloidal inorganic oxide, subjecting said aquasol to cooling and adding thereto a water-miscible organic solvent, whereby substantially all of said salt precipitates out, and then removing the precipitated salt.

3. The method of preparing a relatively stable sol which comprises forming an aquasol containing a dissolved inorganic salt and a colloidal inorganic oxide, adding from about .5 to 25% of a water-miscible organic solvent, cooling the resulting organo-aqua sol until substantially all of said salt precipitates out, and then removing the precipitated salt.

4. The method of preparing a relatively stable sol which comprises forming an aquasol containing a dissolved inorganic salt and a colloidal inorganic oxide, cooling said aquasol to about 0° C., and then removing the precipitated salt.

5. The method of preparing a relatively stable sol which comprises forming an aquasol containing a dissolved inorganic salt and a colloidal inorganic oxide, adding from about .5 to 25% of a water-miscible organic solvent, cooling the organo-aqua sol to about 0° C., and then removing the precipitated salt.

6. The method of preparing a relatively stable sol which comprises forming an aquasol containing a dissolved inorganic salt and a colloidal inorganic oxide, adding from about .5 to 25% of ethyl alcohol, cooling the resulting organo-aqua sol until substantially all of said salt precipitates out, and then removing the precipitated salt.

7. The method of preparing a relatively stable sol which comprises forming an aquasol containing a dissolved inorganic salt and a colloidal inorganic oxide, adding from about .5 to 25% of propyl alcohol, cooling the resulting organo-aqua sol until substantially all of said salt precipitates out, and then removing the precipitated salt.

8. The method of preparing a relatively stable sol which comprises forming an aquasol containing a dissolved inorganic salt and a colloidal inorganic oxide, adding from about .5 to 25% of acetone, cooling the resulting organo-aqua sol until substantially all of said salt precipitates out, and then removing the precipitated salt.

9. The method of preparing a relatively stable sol which comprises forming an aquasol containing a dissolved inorganic salt and a colloidal inorganic oxide, adding from about .5 to 25% of ethyl alcohol, cooling the organo-aqua sol to about 0° C., and then removing the precipitated salt.

10. The method of preparing a relatively stable silica sol which comprises reacting sodium silicate, sulfuric acid and water in proportions sufficient to produce a sol having a silica content of at least 15% and a pH of between 1.8 and 4.5, adding from about .5 to 25% of a water-miscible organic solvent, cooling the resulting organo-aqua sol until substantially all of said salt precipitates out, and then removing the precipitated salt.

11. The method of preparing a relatively stable silica sol which comprises reacting sodium silicate, sulfuric acid and water in proportions sufficient to produce a sol having a silica content of at least 15% and a pH of between 1.8 and 4.5, adding from about .5 to 25% of ethyl alcohol, cooling the resulting organo-aqua sol to about 0° C., thereby precipitating out sodium sulfate, and then removing said sodium sulfate.

12. The method of treating a sol containing an inorganic salt dissolved therein which comprises cooling said sol until a major proportion of said salt precipitates out, and then removing the precipitated salt.

13. The method of separating an inorganic salt from an aquasol having said salt dissolved therein which comprises subjecting said sol to cooling and adding thereto a water-miscible organic solvent, whereby substantially all of said salt precipitates out, and then removing said salt.

JOHN F. WHITE.